Patented May 24, 1949

2,470,902

UNITED STATES PATENT OFFICE 2,470,902

ALKYLATION OF PHENOLS

Robert H. Rosenwald, Western Springs, Ill., assignor to Universal Oil Products Company, Chicago, Ill., a corporation of Delaware No Drawing. Application September 28, 1946, Serial No. 700,177

8 Claims. (Cl. 260—613)

This invention relates to the reaction of a phenolic compound with a compound capable of yielding an alkyl radical. It is more particularly concerned with the reaction of a phenol with an alkylating agent in the presence of a phenol alkylation catalyst by a process which increases the yield of monoalkylated product and suppresses the production of polyalkylated phenol.

In the alkylation of phenols by the usual methods, the product contains a considerable amount of polyalkylated phenols. If the desired product is the monoalkylphenol, the production of the more highly alkylated material represents a loss of phenol and alkylating agent which can only be recovered or converted into the desired monoalkylated product by relatively costly methods, such as dealkylation, alkyl transfer, and the like. Therefore, it is of great economic importance to reduce the yield of the higher alkylated phenols without at the same time lowering the yield of the monoalkylated phenol. I have discovered a simple and inexpensive method of alkylating phenols whereby this objective is attained.

In one embodiment my invention relates to a process which comprises reacting, in the liquid phase, an alkylatable phenol with an alkylating agent in the presence of a phenol alkylation catalyst and continuously removing the alkylated phenol from the catalyst phase by contacting said phase with a solvent selective for said alkylated phenol.

To illustrate my invention, I have found that when p-methoxyphenol is alkylated with isobutylene using phosphoric acid as the catalyst, about 25–30% of the phenol normally is converted to 2,5-dibutyl-p-methoxyphenol and only about 70–75% is converted to monobutyl-p-methoxyphenol. However, when the catalyst phase is continuously extracted with a suitable solvent such as a hexane or heptane fraction, there is a substantial reduction in the yield of the dibutylated product, said reduction frequently amounting to 70% or more, and a corresponding increase in the yield of monobutylphenol. The p-methoxyphenol is only slightly soluble in hydrocarbons and dissolves chiefly in the phosphoric acid; whereas the alkylated phenol is more soluble in the hydrocarbon phase and is removed from the acid phase shortly after formation thus reducing the opportunity for further alkylation.

The utility of my invention as applied to the foregoing reaction can be seen from the fact that 2-tertiary butyl-4-methoxyphenol, the principal monoalkylated product, is an excellent inhibitor for substances such as gasoline and edible fats and oils; whereas 2,5-ditertiary butyl-4-methoxyphenol, the chief dialkylated product, is considerably less effective. For example, in gasoline the dibutylated product exhibits only 15% of the potency of the monobutylated compound. Thus it is important to suppress the formation of the dialkylated phenol. A small reduction in the yield of this material results in a relatively large increase in the inhibiting potency of the product.

Phenolic compounds that may be reacted with compounds capable of yielding an alkyl radical in accordance with the process of this invention must contain at least one substitutable nuclear or hydroxyl hydrogen atom. Examples of such compounds are phenol, polyhydric phenols, such as hydroquinone, catechol, and hydroxyquinol, alkoxyphenols, such as guaiacol, p-methoxyphenol, and p-ethoxyphenol in which the number of carbon atoms in the alkyl group is small, cresol, and the like. The preferred phenolic compounds are those that are only sparingly soluble in hydrocarbons.

The alkylating agents utilizable in this process include substances capable of yielding an alkyl group at the conditions of operation employed in the process. Examples of such substances are olefins, both normally gaseous and normally liquid, cycloolefins, mercaptans, mineral acid esters such as alkyl halides, and alkoxy compounds of the class consisting of aliphatic alcohols, ethers, and esters of carboxylic acids. The various alkylating agents herein mentioned have the property of producing alkyl groups as intermediates or at least as transient intermediates during the course of the reactions which result in the alkylation of phenols. In general olefins and alcohols are the most useful alkylating agents in my process. Ethylene is difficultly reactable with phenols and for this reason its use is limited.

The catalysts that may be used in this process consist of those substances which promote the alkylation of phenols and which are relatively insoluble in hydrocarbons. Such catalysts include sulfuric acid, ethyl sulfonic acid, benzene disulfonic acid, phosphoric acid, mixtures of sulfuric and phosphoric acids, hydrogen fluoride, hydrogen fluoride-boron fluoride, monohydroxyfluoboric acid, and the like. Some of these catalysts promote oxygen alkylation as well as nuclear alkylation, but my invention is applicable in both cases because both phenyl alkyl ethers and alkylphenols are more soluble in the solvent than the unalkylated phenols. The use of a solvent is beneficial when reagents such as sodium hydroxide are used with alkylating agents such as dimethylsulfate or tertiary butyl chloride. Such reagents are not catalysts but they form a separate phase in which the unalkylated phenol is more soluble than the alkylated phenol.

The solvent or extraction agent used in this process should be one in which alkylated phenols are more soluble than unalkylated phenols. In addition, it should be liquid at the operating conditions used in the process, and it should be substantially inert with respect to the reactants and catalyst. Suitable solvents include normal pentane, hexane, heptane, and octane, straight-run naphthas that have been treated to remove alkylatable aromatics, chlorinated hydrocarbons such as chlorobutane and carbon tetrachloride, and the like. Hydrocarbons are the preferred solvents. When the process is conducted at substantial pressures, normal butane and even propane may be used.

The process of my invention may be carried out in batch operation by placing the catalyst and solvent in a reactor equipped with a stirring device, adding the phenol, heating to a reaction temperature, slowly adding the alkylating agent while mixing the contents of the reactor, cooling the reaction mixture, separating the solvent phase from the catalyst phase and recovering the alkylated phenol from the solvent by means such as distillation, crystallization, or caustic extraction followed by acidification. However, the preferred method of operation is of the continuous type. In one form of this operation the catalyst, solvent, phenol, and alkylating agent are continuously charged to a reactor wherein they are subjected to intimate contact at alkylating conditions. The reactor effluent is passed to a settler wherein a separation is effected between the catalyst and solvent phases. At least a portion of the catalyst is continuously recycled to the reaction zone and the solvent phase is processed for recovery of the alkylated phenol. In another mode of continuous operation the alkylating agent, phenol, and catalyst are charged to the reactor. The reactor effluent consisting of alkylated phenol and unconverted phenol dissolved in the catalyst is passed into an extraction zone wherein the mixture is contacted with a suitable solvent such as hexane. The extraction zone may consist, for example, of a packed tower in which the catalyst phase and solvent are contacted countercurrently or it may consist of a mixer and settler. The solvent removes the more soluble alkylated phenol and the extracted phenol-catalyst mixture is returned to the reaction zone while the solvent, containing monoalkylated phenol, is subjected to distillation, etc., for recovery of the desired product.

The alkylation step is conducted at the usual alkylating temperatures which may be within the approximate range of about −20° C. to about 175° C. The preferred temperature will depend upon the particular phenol and alkylating agent being charged to the process and upon the activity of the particular catalyst employed. The pressure should be such that substantially all of the reactants and solvent are in the liquid phase. In general these pressures will lie within the range of from about 1 to about 100 atmospheres. The contact time may be varied from a few minutes to several hours. A molal excess of the phenol over the alkylating agent in the reaction zone promotes monoalkylation and suppresses dialkylation.

The following examples are given to illustrate my invention but they are not introduced with the intention of unduly limiting the generally broad scope of said invention.

*Examples I through V*

The operating conditions and results of five experiments in which p-methoxyphenol was alkylated with isobutylene and tertiary butyl alcohol in the presence of 85% phosphoric acid are shown in the following table. The experiments were carried out by placing the phenol and catalyst in a flask equipped with a stirrer and, in those experiments in which a solvent was used, it was added at this time. The olefin was then gradually added to the stirred mixture over a period of 1–1½ hours after which the alkylated products were recovered by neutralization and distillation.

| Example | 1 | 2 | 3 | 4 | 5 |
|---|---|---|---|---|---|
| Temperature, ° C | | | 50 | | |
| Pressure | | | Atmospheric | | |
| Phosphoric Acid, g | | | 300 | | |
| Para methoxyphenol, g | | | 124 | | |
| Isobutylene, g | 56 | 56 | 56 | 0 | 0 |
| Tertiary butyl alcohol | 0 | 0 | 0 | 73 | 73 |
| Hexane, ml | 0 | 300 | 1,000 | 0 | 300 |
| Product, g | 149 | 151 | 154 | 153 | 156 |
| Per cent monotertiary butyl-para methoxyphenol | 71 | 81 | 85 | 67 | 78 |
| Per cent ditertiary butyl-para methoxyphenol | 21 | 11 | 8.7 | 17 | 8 |

It can be seen that the presence of the solvent not only decreased the yield of the dialkylated phenol but its presence resulted in a substantial increase in the yield of monoalkylated phenol.

*Examples VI and VII*

A continuous experiment was made in which equimolal quantities of isobutylene and p-methoxyphenol were charged to a reactor containing sulfuric acid maintained at 50° C. The effluent from the reactor was continuously passed to an acid settler from which the acid phase was continuously returned to the reactor. After an appreciable amount of reaction had taken place, a second phase appeared in the acid settler, said phase comprising chiefly alkylated methoxyphenol. Said phase was continuously removed from the settler. The product from the run contained 75% mono-tertiary butyl-p-methoxyphenol and 15% di-tertiary butyl-p-methoxyphenol.

The continuous experiment described above was repeated but in this case the reactor effluent was sent to an extractor where it was contacted countercurrently with an acid treated heptane fraction. The acid phase from the extractor was returned to the reactor and the heptane from the extractor was distilled for recovery of the alkylation products. In this experiment the product contained 90% of mono-tertiary butyl-p-methoxyphenol and only 2½% of di-tertiary butyl-p-methoxyphenol.

I claim as my invention:

1. In the catalytic alkylation of phenols wherein there is formed a catalyst phase containing dissolved mono-alkylated phenol and unreacted phenol, the improvement which comprises removing said catalyst phase from the alkylating zone and extracting the mono-alkylated phenol therefrom by contacting the catalyst phase with a selective solvent selected from the group consisting of paraffinic hydrocarbons and chlorinated paraffinic hydrocarbons, thereafter returning the thus treated catalyst phase to the alkylating zone, and recovering the extracted mono-alkylated phenol from said solvent.

2. In the catalytic alkylation of phenols wherein there is formed a catalyst phase containing dissolved mono-alkylated phenol and unreacted phenol, the improvement which comprises removing said catalyst phase from the alkylating zone and contacting the same with a paraffinic solvent to extract the mono-alkylated phenol therefrom, thereafter returning the thus treated catalyst phase to the alkylating zone, and recovering the extracted mono-alkylated phenol from said solvent.

3. A process which comprises alkylating p-methoxyphenol in the presence of an alkylation catalyst in a reaction zone, thereby forming a catalyst phase containing dissolved mono-alkylated p-methoxyphenol and unreacted p-methoxyphenol, removing said catalyst phase from the reaction zone and contacting the same with a paraffinic solvent to extract the mono-alkylated p-methoxyphenol therefrom, returning the thus treated catalyst phase to the reaction zone, and recovering the extracted mono-alkylated p-methoxyphenol from said solvent.

4. The process of claim 3 further characterized in that said catalyst comprises a phosphoric acid.

5. The process of claim 3 further characterized in that said catalyst comprises sulfuric acid.

6. The process of claim 3 further characterized in that said catalyst comprises an aryl sulfonic acid.

7. The process of claim 3 further characterized in that the p-methoxyphenol is alkylated with isobutylene.

8. The process of claim 3 further characterized in that the p-methoxyphenol is alkylated with tertiary butyl alcohol.

ROBERT H. ROSENWALD.

REFERENCES CITED

The following references are of record in the file of this patent:

UNITED STATES PATENTS

| Number | Name | Date |
|---|---|---|
| 1,948,287 | Buc | Feb. 20, 1934 |
| 2,008,032 | Niederl | July 16, 1935 |
| 2,060,573 | Hester | Nov. 10, 1936 |
| 2,147,256 | Ipatieff | Feb. 14, 1939 |
| 2,415,069 | Arvin | Feb. 4, 1947 |